United States Patent
DiGiovanni et al.

(10) Patent No.: US 7,171,074 B2
(45) Date of Patent: Jan. 30, 2007

(54) LARGE MODE AREA FIBERS USING HIGHER ORDER MODES

(75) Inventors: David J. DiGiovanni, Montclair, NJ (US); Siddharth Ramachandran, Hoboken, NJ (US)

(73) Assignee: Furakawa Electric North America Inc., Norcross, CA (US)

(*) Notice: Subject to any disclaimer, the term of this patent is extended or adjusted under 35 U.S.C. 154(b) by 77 days.

(21) Appl. No.: 10/990,088

(22) Filed: Nov. 16, 2004

(65) Prior Publication Data

US 2006/0103919 A1    May 18, 2006

(51) Int. Cl.
- G02B 6/26 (2006.01)
- G02B 6/02 (2006.01)
- H04B 10/12 (2006.01)
- G02B 6/34 (2006.01)

(52) U.S. Cl. .................. 385/28; 385/27; 385/123; 385/127; 385/50; 359/341.5; 359/333; 359/341.1; 359/341.3

(58) Field of Classification Search ........ 385/123–128, 385/27, 28, 39, 50, 37; 359/341.5, 333, 341.1, 359/341.3
See application file for complete search history.

(56) References Cited

U.S. PATENT DOCUMENTS

| | | | |
|---|---|---|---|
| 5,781,684 A | * | 7/1998 | Liu .......................... 385/124 |
| 6,985,654 B2 | * | 1/2006 | De Barros et al. ........... 385/28 |

* cited by examiner

*Primary Examiner*—Brian Healy
*Assistant Examiner*—Michael P. Mooney

(57) ABSTRACT

The specification describes an optical fiber device wherein a LOM is converted to an HOM prior to entering the gain section. The gain section is a few mode fiber that supports the HOM. The output from the gain section, i.e. the HOM, may be utilized as is, or converted back to the LOM. With suitable design of the few mode fiber in the gain section of the device, the effective area, Aeff, may be greater than 1600 $\mu m^2$. The large mode separation in the gain section reduces mode coupling, allowing greater design freedom and reducing the bend sensitivity of the optical fiber.

20 Claims, 6 Drawing Sheets

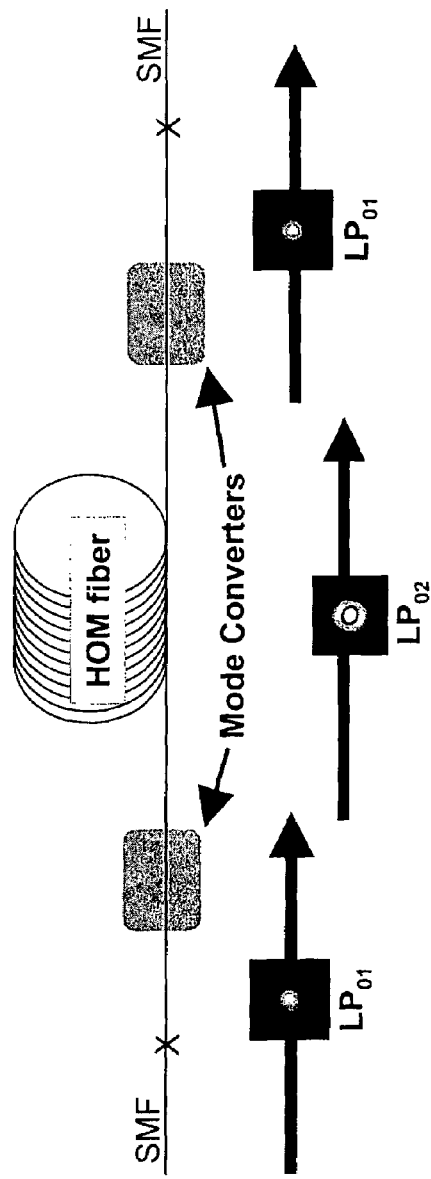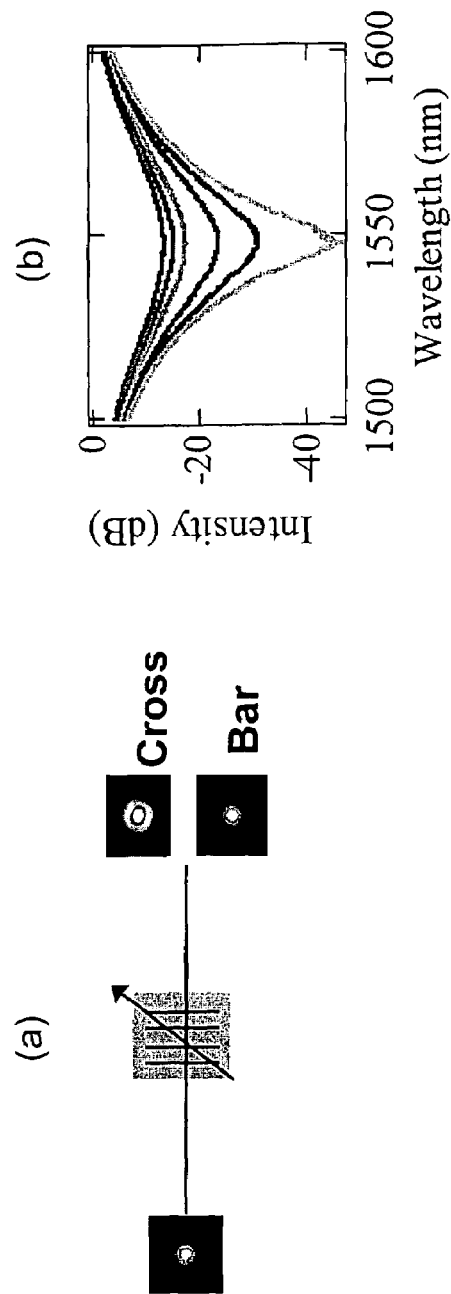

LARGE MODE AREA FIBERS USING HIGHER ORDER MODES

FIELD OF THE INVENTION

This invention relates to optical fiber devices, such as lasers and amplifiers, that produce high power levels through the use of large effective mode area. More specifically, the devices derive improved performance characteristics when the gain element is deliberately operated in a higher order mode.

BACKGROUND OF THE INVENTION (Parts of the following section may not be prior art.)

Fiber lasers with high pulse energy, good beam quality and excellent optical characteristics have applications in many fields and industries such as materials processing (marking, welding, semiconductor wafer and mask repair etc), medical and industrial spectroscopy (fluorescence, absorption), illumination, remote sensing and spectroscopy (wind speed, biohazards, ecosystem mapping etc), ranging and targeting (collision avoidance, military applications etc) and scientific instrumentation. For reasons of simplicity and efficiency, $Yb^{3+}$-doped fibers are most commonly used. They can be optically pumped from 915 nm–975 nm and achieve emission from 975–1100 nm with optical conversion efficiency as high as 70%. Currently, advances in this field are primarily constrained by limitations in maximum extractable energy, and the onset of nonlinear impairments. Saturation energy of the gain medium is a key parameter for determining how much energy can be stored in an amplifier, and is given by[i]

$$E_{sat} = \frac{h\nu_s A_{eff}}{(\sigma_{es} + \sigma_{as})\Gamma_s} \quad (1)$$

where $\sigma_{es}, \sigma_{as}$ are the emission and absorption cross section at the signal wavelength, $h\nu_s$ is signal energy at frequency $\nu_s$, $A_{eff}$ is area of the active doped region and $\Gamma_s$ is signal overlap with the active dopant. As a general rule, the extractable energy stored in a fiber is limited to around ten times the saturation energy. As an example, for standard single mode $Yb^{3+}$ doped fiber with 8 μm core diameter, $E_{sat}$=0.04 mJ, indicating extraction of only about 0.4 mJ per pulse.

Two deleterious nonlinear effects of concern are stimulated Brillouin scattering (SBS) and stimulated Raman scattering (SRS). Both rob power from the signal and can cause catastrophic damage. For SRS, the threshold for peak power $P_{th}$ before onset of serious Raman scattering in passive fibers is given by:

$$P_{th} = \frac{16 A_{eff}}{g_R L} \quad (2)$$

where $A_{eff}$ is the effective mode area of the fiber, $g_R$ is the Raman gain coefficient and L is the fiber length. For a fiber with 25 μm core diameter, $P_{th} \cdot L \sim 70$ kWm. Since typical fiber lengths exceed 5 meters, this indicates peak powers of only 20 kW before Raman scattering becomes severe.

Stimulated Brillouin scattering arises from interaction of the signal with longitudinal acoustic modes of the fiber, causing part of the signal to be reflected backwards. Similar to the case of SRS, the threshold condition for SBS can be written as:

$$P_{th} = \frac{21 A_{eff}}{g_B L}\left(1 + \frac{BW}{BW_{SiO_2}}\right) \quad (3)$$

where $g_B$ is the Brillouin gain coefficient, BW is the bandwidth of the signal and $BW_{SiO_2}$ is the Brillouin bandwidth of a silica, i.e. $SiO_2$, fiber (~50 MHz for silica). If the signal has bandwidth comparable to $BW_{SiO_2}$, then for a fiber with 25 μm core diameter, $P_{th} \cdot L \sim 350$ Wm. This is obviously a severe constraint and mitigation is desirable. For both SBS and SRS impairments, equations (3) and (4) indicate mitigation is possible by increasing the modal area and decreasing the fiber length. Because a larger core occupies a larger fraction of the overall fiber cross-section and therefore has higher pump absorption, the optimum fiber length varies inversely with $A_{eff}$. Thus, increasing the core area naturally results in shorter length. Since the nonlinear effects vary as A/L, the increase in threshold varies as $A_{eff}^2$.

Currently, the practical solution for obtaining large $A_{eff}$ fiber is conceptually straightforward—simply increasing the core diameter. This results in monotonically increasing $A_{eff}$ of the signal. However, there are several limitations to this approach. For single-mode operation, as the core diameter increases, the refractive index difference between the core and cladding, Δn, must decrease. If Δn<0.001, though, the fiber becomes bend sensitive. And when Δn is fixed at a minimum, further increase in core diameter results in multimode operation. While this is permissible, core size is then constrained by unavoidable but undesirable energy transfer among modes.

The mode coupling efficiency η between modes in a multimode fiber is given by $$\eta \sim \frac{\lambda^2 \kappa^2}{\Delta n_{eff}^{2p}} \quad (4)$$

where κ is the perturbation amplitude due to index and microbend fluctuations, $\Delta n_{eff}$ is the difference in effective indices between different modes, and ρ is a fitting parameter (with value>0) to account for mechanical perturbations on a fiber. Thus, large $\Delta n_{eff}$ (e.g.>8×10$^{-5}$) is desirable for low mode coupling. Unfortunately, as $A_{eff}$ increases, $\Delta n_{eff}$ decreases and rapidly asymptotes to values much smaller than 8×10$^{-4}$, and mode coupling cannot be reduced. This is illustrated in FIG. 1, which shows simulations of two designs for achieving $A_{eff}$~1600 μm$^2$ (mode field~45 μm). FIG. 1a shows the refractive index profiles of the designs considered. The fiber with higher Δn has $\Delta n_{eff}$=6×10$^{-5}$, indicating that it is highly susceptible to mode coupling. Note that this mode has negligible bend loss, as shown in FIG. 1b. Even with a huge reduction in Δn, $\Delta n_{eff}$ is only increased by 30% and mode coupling remains catastrophic. Note that this reduction in Δn leads to extreme bend loss (FIG. 1b).

FIG. 1c illustrates an additional problem with large $A_{eff}$ designs. All applications of high power lasers and amplifiers involve spatially transforming and focusing the device output. This is best achieved with Gaussian beams. Thus, an important metric for high power devices is the M$^2$ of the output light, where $M^2$ is a measure of the departure from a perfect Gaussian spatial profile ($M^2=1$ is a perfectly Gaussian mode), given by:

$$M^2 = \frac{\int r^2 E^2 r \cdot dr}{\int \left(\frac{dE}{dr}\right)^2 r \cdot dr} \quad (5)$$

where E is the electric field profile of the mode, and r is the radial coordinate. FIG. 1c shows two mode profiles representing two different $M^2$ values for the two different designs (low and high mode coupling) represented in FIG. 1a. The output beam, becomes highly distorted ($M^2$ dramatically increases) for the design with low mode coupling, and is sensitive to index perturbations in the core. Very tight control of fiber fabrication conditions is therefore necessary to maintain good beam quality, and this is difficult in fibers with $A_{eff} > 350$ $\mu m^2$.

Current preferred laser designs concentrate on means to force operation in a fundamental mode, even though the fiber may guide several modes. One disclosed means to achieve this is to preferentially strip the higher order modes (HOM). While this may be adequate for moderate $A_{eff}$, the higher modal content of large $A_{eff}$ fibers leaves little room for discrimination of bend loss between modes. Alternatively, gain-inducing dopants can be selectively deposited in a fiber preform so that only the fundamental mode is substantially amplified or guided. While this technique would allow amplification of the desired mode in comparison to HOMs, it is designed for cases where the fundamental mode is substantially spatially separated from the HOMs—a condition typically absent in very large $A_{eff}$ fibers. Another approach is to dope the fiber in a ring around the core rather than in the core itself. This increases the gain saturation limit of the gain medium, allowing extraction of higher power pulses. However, this technique leads to significant degradation of the output mode profile, i.e. departure from $M^2=1$. Since many of the HOMs overlap spatially, mode coupling and mode discrimination becomes problematic.

Given the numerous performance trade-offs, gain fibers with current technology face a practical limit of mode field diameter ~20 $\mu m$ ($A_{eff}=350$ $\mu m^2$) with little prospect of future advances using conventional engineering expedients. Thus there exists a need for an amplifier fiber that simultaneously yields very large $A_{eff}$, low mode coupling, and good output beam quality.

STATEMENT OF THE INVENTION

We have developed a new approach to the realization of optical fiber devices with very large mode area, good bend loss performance, large spacing between guided modes (for low mode coupling), and good beam quality ($M^2 \sim 1$). These properties are produced, according to the invention, by using a few mode optical fiber, and converting the input signal to a higher order mode. This yields significant design flexibility, so that all the desirable properties (large $A_{eff}$, low bend loss, low mode coupling and $M^2 \sim 1$) can be simultaneously achieved.

Two embodiments of fiber designs suitable for implementing the invention are described below. These are illustrative of optical fibers wherein the HOM is the LP02 mode, but the invention can be implemented with any HOM guided by the fiber. It may also be implemented using a conversion of lower mode input (LOM) to HOM.

The first design class (called the ring design, henceforth) illustrates a fiber with a central core and one or more high index rings followed by a down-doped region. The second design class (called the truncated cladding design, henceforth) comprises a central core and an inner cladding, followed by a broad down-doped region spaced significantly from the center of the fiber. Both of these designs can yield $A_{eff}$ for the $LP_{02}$ mode ranging up to 2800 $\mu m^2$ and beyond. Furthermore, the deep-down-doped regions ensure that the HOM is not radiated, and thus good bend loss performance is obtained. The enhanced design flexibility for HOM fibers enables designing them with large effective index separations ($\Delta n_{eff}$—the difference in effective index between the $LP_{02}$ mode and any other guided mode). Designs guiding the $LP_{12}$ mode in addition to the desired $LP_{02}$ mode yield $\Delta n_{eff} > 8 \times 10^{-5}$, while designs that guide only the $LP_{01}$, $LP_{11}$, and $LP_{02}$ modes yield $\Delta n_{eff}$ as high as $3 \times 10^{-3}$. Thus, these fibers exhibit very low mode coupling problems. In addition, the $LP_{02}$ mode is vastly spatially separated from other guided modes in the fiber. Thus, preferential gain-guiding mechanisms attempted earlier for fundamental mode gain fibers, can be readily applied here to further increase modal discrimination and decrease the deleterious effects of mode mixing. Another advantage of these fibers is that while the signal propagates in the $LP_{02}$ mode, light enters/exits the fiber in the fundamental, $LP_{01}$ mode. The characteristics of this mode are governed by the central core, while those of the $LP_{02}$ mode are governed by other features. Hence, the central core can be designed to yield a $LP_{01}$ mode with mode profile almost indistinguishable from a perfect Gaussian mode profile.

In some cases, for efficient operation, it is helpful to add suitable core dopants that necessarily increase the core index. For example Er/Yb fibers use high phosphorous concentrations. High $\Delta$ cores avoid use of large MFD if fundamental mode operation is desired. HOMs can be designed to propagate in high $\Delta$ regions.

Since signal propagation is in the $LP_{02}$ mode rather than the fundamental mode, the fiber is provided with mode-converters to convert the incoming signal in the fundamental mode, into the HOM. The output signal may either be down-converted to the $LP_{01}$, mode, or focused/collimated as is. Mode converters also function as wavelength selective filters, such as a bandpass filter. These are useful for filtering out unwanted ASE r stokes shifted light. Thus, use of HOMs is advantageous even if $A_{eff}$ is not large.

The inventive features may be more easily followed with the aid of the drawing:

BRIEF DESCRIPTION OF THE DRAWING

FIG. 7 is a schematic diagram of the overall system of the invention;

FIG. 8*a* is a schematic diagram representing a long period grating (LPG) switchable mode converter showing input and output mode distribution spectra;

FIG. 8*b* is a plot showing typical spectral features of the LPGs of FIG. 8*a* using different mode-converting efficiencies;

DETAILED DESCRIPTION

As mentioned previously, two distinct embodiments of fiber designs suitable for the gain section of the devices of the invention will be described. These are illustrative of optical fibers wherein the HOM is the LP02 mode, but the invention can be implemented with any HOM guided by the fiber. It should also be understood that other optical fiber designs may be found useful for obtaining the high effective area performance demonstrated by the two designs shown here. These optical fibers are examples of a category of optical fibers known as few mode fibers. They have a mode field larger than a single mode fiber.

The ring design optical fiber has a central core and one or more high index rings (with $\Delta n > 2 \times 10^{-3}$) of thickness greater than 2 µm, followed by a deep down doped region ($\Delta n < -0.003$) with a thickness of at least 5 µm. The high index ring exists at a radial position greater than 20 µm from the center of the fiber. The desired mode field diameter is at least 20 microns, preferably >40 µm. For designs utilizing the wavelength selectivity of mode converters, this invention is advantageous even with small (6–10 µm) MFD fiber.

Figure 1A:
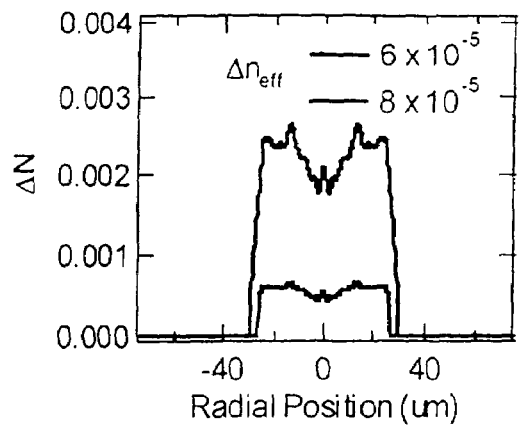
FIGS. 1a–c show performance characteristics that the invention is aimed at improving.
Figure 1B:
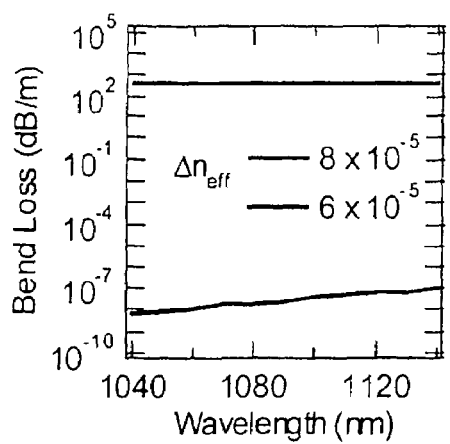
Figure 1C:
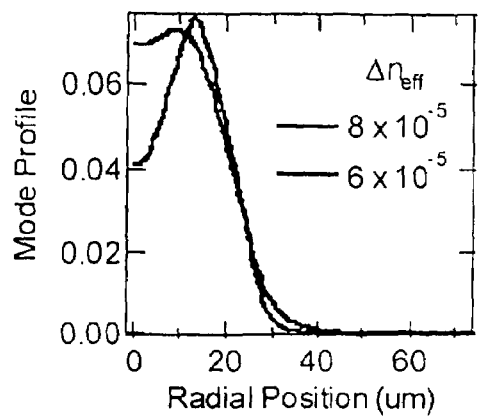
Figure 2:
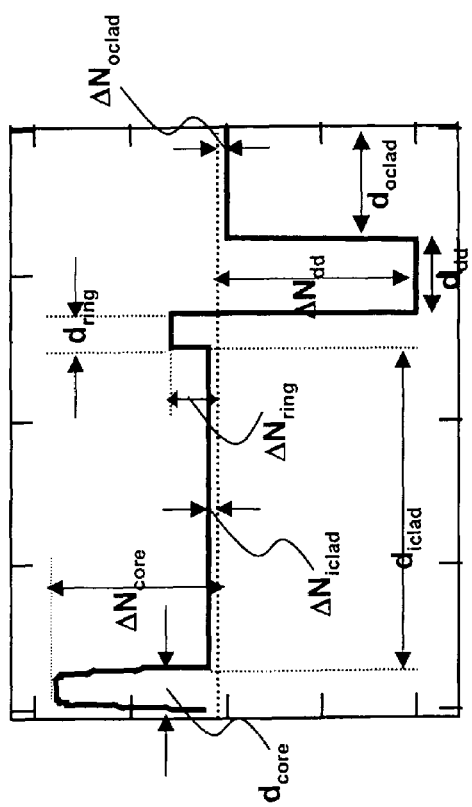
FIG. 2 is a schematic of a refractive index profile for a ring design fiber of the invention.

FIG. 2 shows the canonical refractive index profile for a ring design fiber, and is characterized by the values $\Delta N_{core}$, $\Delta N_{iclad}$, $\Delta N_{ring}$, $\Delta N_{dd}$, and $\Delta N_{oclad}$, representing the refractive index values of the core, inner clad, ring, deep down-doped and outer clad regions, respectively. The radial positions of these index features is governed by $d_{core}$, $d_{iclad}$, $d_{ring}$, $d_{dd}$, and $d_{oclad}$, representing the thicknesses of the core, inner clad, ring, deep down-doped and outer clad regions, respectively. The central core has refractive index $\Delta n_{core}$, and thickness $d_{core}$, such that the $LP_{01}$, and $LP_{11}$, modes substantially reside within it. Hence, their modal properties are governed almost exclusively by this region. On the other hand, the inner cladding, ring and deep down-doped regions govern the properties of the $LP_{02}$ mode.

Figure 3:
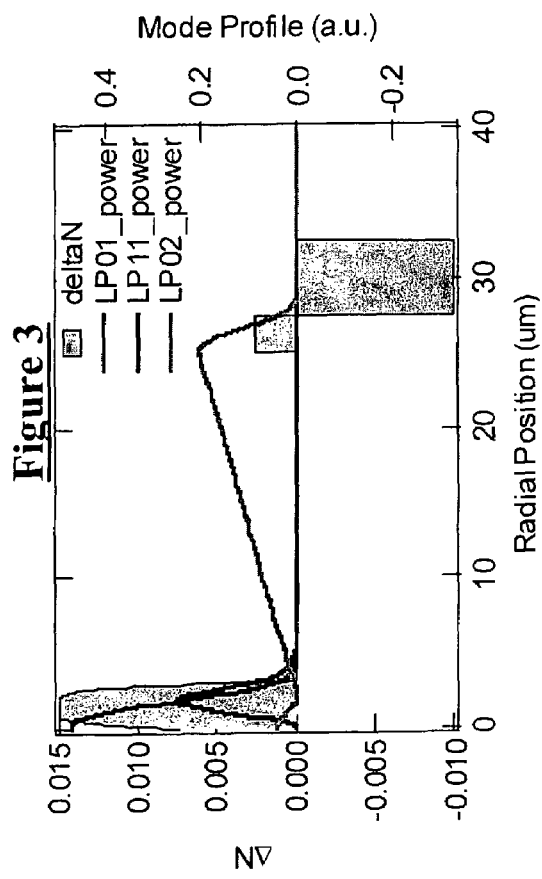
FIG. 3 is a refractive index profile as well as a mode distribution plot for the optical fiber of FIG. 2.

FIG. 3 shows a typical refractive index profile for this design class, along with the modal profiles for the $LP_{01}$, $LP_{11}$, and $LP_{02}$ modes. It is immediately evident that the $LP_{02}$ power resides in regions substantially separated from the $LP_{01}$, and $LP_{11}$ modes. Thus, preferential amplification or gain-guiding mechanisms can be readily applied to this design, to amplify only the $LP_{02}$ mode in comparison to other modes. For more details of these mechanisms see U.S. Pat. No. 5,187,759, the content of which is incorporated herein by reference. This fiber has $A_{eff} \sim 2100$ µm², and only guides the $LP_{01}$, $LP_{11}$ and the desired $LP_{02}$ mode. The difference in effective indices between nearest neighbors, $\Delta n_{eff} = 3 \times 10^{-3}$, which is at least an order of magnitude larger than that in conventional, fundamental mode fibers with substantially lower $A_{eff}$. This illustrates the vast large $A_{eff}$ design space accessible to HOMs. Furthermore, the design parameters (as given by the refractive index values and thickness values illustrated in FIG. 2) can be modified to yield fibers with vastly different $A_{eff}$. This is illustrated in the following Table, which shows the variation of the parameters of interest, as a function of $d_{iclad}$, the thickness of the inner clad region.

TABLE

| $d_{clad}$ | $A_{eff}(\mu m^2)$ | Minimum $\Delta n_{eff}$ | $M^2$ |
|---|---|---|---|
| 19 | 1670 | $3.894 \times 10^{-3}$ | 1.02 |
| 22 | 2088 | $3.890 \times 10^{-3}$ | 1.02 |
| 24 | 2386 | $3.888 \times 10^{-3}$ | 1.02 |
| 27 | 2860 | $3.886 \times 10^{-3}$ | 1.02 |

Note that for $LP_{02}$ mode $A_{eff}$ ranging from 1600 to 2800 µm², the output mode shape ($M^2 \sim 1.02$) remains the same, as expected, since the output mode is governed by the $LP_{01}$ mode and not the $LP_{02}$ mode. In addition, $\Delta n_{eff}$ also remains larger than $10^{-4}$ for all these designs, indicating that they are robust with respect to mode coupling problems.

The truncated cladding design optical fibers comprise a central core, an inner cladding of index similar to that of silica, followed by a deep down-doped region ($\Delta N < -0.003$), at a radial position greater than 20 µm from the center of the fiber. The down-doped region has a thickness greater than 5 µm, and can extend to the periphery of the fiber.

Figure 4:
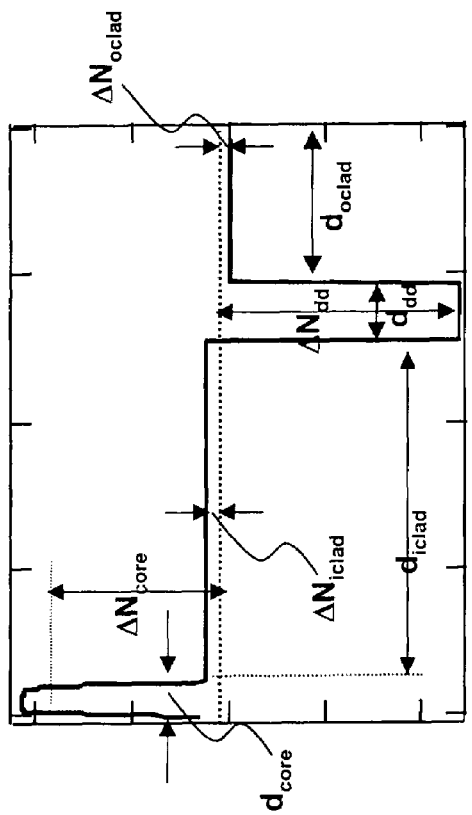
FIG. 4 is a schematic of a refractive index profile for a truncated cladding design fiber of the invention.

FIG. 4 shows the canonical refractive index profile for a truncated cladding design fiber, and is characterized by the values $\Delta n_{core}$, $\Delta n_{iclad}$, $\Delta n_{dd}$, and $\Delta n_{oclad}$, representing the refractive index values of the core, inner clad, deep down-doped and outer clad regions, respectively. The radial positions of these index features is governed by $d_{core}$, $d_{iclad}$, $d_{dd}$, and $d_{oclad}$, representing the thicknesses of the core, inner clad, deep down-doped and outer clad regions, respectively. The central core has refractive index $\Delta n_{core}$, and thickness $d_{core}$, such that the $LP_{01}$, and $LP_{11}$ modes substantially reside within it. Hence, their modal properties are governed almost exclusively by this region. On the other hand, the inner cladding and deep down-doped regions govern the properties of the $LP_{02}$ mode.

Figure 6:
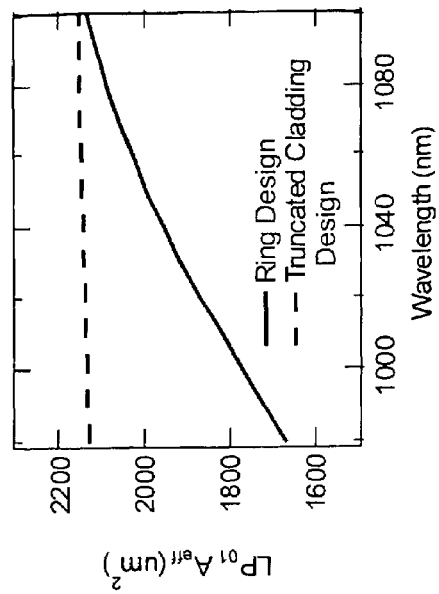
FIG. 6 is a plot comparing the optical fibers of FIGS. 3 and 5 with respect to effective area variation with wavelength.
Figure 5:
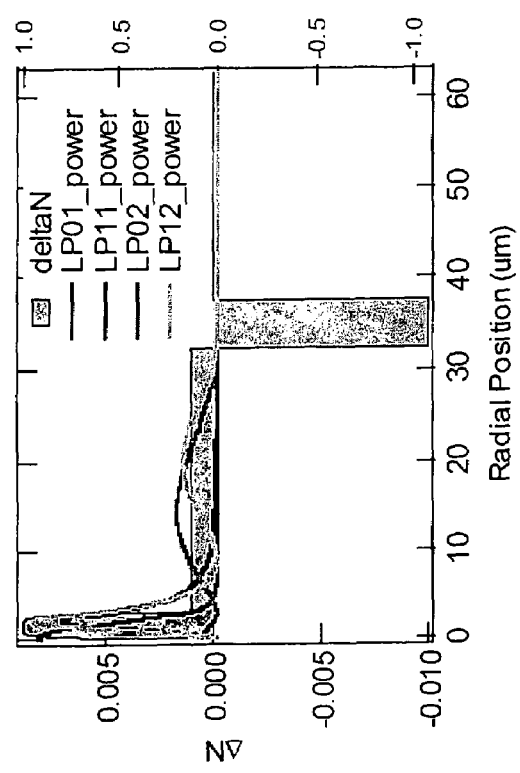
FIG. 5 is a refractive index profile as well as a mode distribution plot for the optical fiber of FIG. 4.

FIG. 5 shows a typical refractive index profile for this design class, along with the modal profiles for the $LP_{01}$, $LP_{11}$, $LP_{12}$ and $LP_{02}$ modes. It is immediately evident that the $LP_{02}$ power resides in regions substantially separated from the $LP_{01}$ and $LP_{11}$ modes. However, unlike in the case of the ring designs, the $LP_{12}$ mode has strong spatial overlap with the $LP_{02}$ mode. Thus, preferential amplification or gain-guiding mechanisms will not be expected to provide additional modal discrimination in this case. While this is a drawback in comparison to the ring designs, this profile is more robust to manufacturing variations in comparison to the ring designs. This is illustrated by FIG. 6, which shows the variation of $A_{eff}$ with respect to operating wavelength, for the two design classes.

The fiber illustrated in FIG. 5 fiber has $A_{eff} \sim 2150$ µm², and difference in effective indices between nearest neighbours, $\Delta n_{eff} = 9 \times 10^{-5}$, which implies that the mode coupling performance of these fibers will also be adequate. As in the case of the ring designs, the thickness of the inner clad $d_{iclad}$, can be varied to yield fibers with a variety of $A_{eff}$ ranging from 1600 to 2800 µm². Again, the output mode shape ($M^2 \sim 1.02$) is as close to Gaussian, as expected, since the output mode is governed by the $LP_{01}$ mode and not the $LP_{02}$ mode.

In the truncated cladding designs, the bend loss for the $LP_{02}$ mode is controlled by the thickness of the deep down-doped region and the outer clad region. However, the spatial overlap between the $LP_{12}$ and $LP_{02}$ mode is also controlled by the deep down-doped region. As a general rule, the thickness of the deep down-doped region $d_{dd}$, can be increased at the expense of $d_{oclad}$ (in the limiting case, $d_{dd}$ can be made large enough to extend throughout the fiber, while eliminating the outer clad, i.e. $d_{oclad}$=0), to increase the confinement of the $LP_{02}$ mode without sacrificing its $A_{eff}$. However, this parameter must be optimized with respect to the degree of spatial overlap between the $LP_{12}$ and $LP_{02}$ modes, and thus the ideal operating point in this design space is for $d_{dd}$ ranging from 5–15 µm.

Both of these designs can be engineered to yield $A_{eff}$ for the $LP_{02}$ mode ranging from 1600 µm² to 2800 µm². Furthermore, the deep-down-doped regions ensure that the HOM is not radiated, and thus good bend loss performance is obtained. The enhanced design flexibility for HOM fibers enables designing them with large effective index separations ($\Delta n_{eff}$—the difference in effective index between the $LP_{02}$ mode and any other guided mode). Designs guiding the $LP_{12}$ mode in addition to the desired $LP_{02}$ mode yield $\Delta n_{eff} > 8 \times 10^{-5}$, while designs that guide only the $LP_{01}$, $LP_{11}$ and $LP_{02}$ modes yield $\Delta n_{eff}$ as high as $3 \times 10^{-3}$. Thus, these fibers exhibit very low mode coupling problems. In addition, the $LP_{02}$ mode is vastly spatially separated from other guided modes in the fiber so that preferential gain-guiding mechanisms attempted earlier for fundamental mode gain fibers, can be readily applied here to further increase modal discrimination and decrease the deleterious effects of mode mixing. Another advantage of these fibers is that while the signal propagates in the $LP_{02}$ mode, light enters/exits the fiber in the fundamental, $LP_{01}$ mode. The characteristics of this mode are governed by the central core, while those of the $LP_{02}$ mode are governed by other features. Hence, the central core can be designed to yield a $LP_{01}$ mode with mode profile metric $M^2 \sim 1.02$, which is almost indistinguishable from a perfect Gaussian mode profile.

Mode converters for converting the incoming, and optionally the outgoing, signals between modes may be of any suitable design. The mode converting functionality may be achieved within the gain fiber using in-fiber grating mode converters. Alternatively, holographic free-space mode converters, or tapered hollow-core fibers, may be employed. Such mode converters can be designed to be broadband or spectrally selective, depending on whether the application is a laser or amplifier. This offers the additional advantage of spectral filtering to reduce noise from amplified spontaneous emission (ASE). Moreover, the mode converters are by definition mode-selective, and hence offer an additional degree of modal discrimination, further decreasing mode-coupling problems.

The fiber designs disclosed above enable propagation of an HOM (in the illustrated examples, the $LP_{02}$ mode) with $A_{eff}$ ranging from 1600 to 2800 µm², and low mode coupling susceptibility. However, in addition the fibers are provided with means to access the HOM. The mode profiles for the $LP_{02}$ mode, depicted in FIGS. 3 and 5 show that they have two power maxima, and are very distinct in shape from the Gaussian profile normally employed in a free-space or conventional fiber apparatus. Hence, the incoming signal in the examples given is converted into the $LP_{02}$ mode. In addition, some applications may also require that the amplified output also be converted into a Gaussian profile, and use an output mode converter that performs the reciprocal function. This is illustrated in FIG. 7, which shows the HOM fiber discussed above connected to mode-converting couplers at the input and output respectively. These mode converters transform the incoming light from the $LP_{01}$ or some Gaussian mode to the $LP_{02}$ mode in the fiber. The reverse—reciprocal action—is realized with the mode converter at the output, which yields a Gaussian output for the device. The input fiber is typically a single mode transmission fiber, or a few mode fiber that strongly guides the fundamental LP01 mode so that the optical signal entering the device is predominantly in the LP01 mode.

A preferred means to obtain the mode-converting device functionality is with co-propagating long period fiber gratings (LPG). LPGs may be induced in the HOM fiber itself, enabling a low cost, low loss mode-converting device. Such gratings may be made narrowband, if only one wavelength of operation is required, or can be arbitrarily broadband. Mode converters are also known that cover a wavelength range as large as 500 nm. For more details see S. Ramachandran, M. Yan, E. Monberg, F. Dimarcello, P. Wisk and S. Ghalmi, "Record bandwidth microbend gratings for spectrally flat variable optical attenuators," *IEEE Photon. Tech. Lett.*, vol. 15, pp. 1561–1563, 2003; S. Ramachandran, U.S. patent application Ser. No. 10/234,289, both of which are incorporated by reference herein.

Suitably designed LPGs can be both static as well as tunable in their mode coupling strength. This is illustrated in FIG. 8, which shows the schematic of switchable mode-conversion enabled by LPGs, along with the input and output mode profiles (FIG. 8a), as well as the typical spectral features of these gratings tuned to a variety of mode-converting efficiencies (FIG. 8b). Since LPGs provide spectral filtering as well as modal discrimination in addition to mode conversion, they enable HOM amplifier schematics (of the kind shown in FIG. 7, for example) to be inherently low noise.

Several other devices may be used in lieu of LPGs to achieve the $LP_{01}$–$LP_{02}$ mode-converting functionality depicted in FIG. 7. Examples of alternate mode converters include:

1) Elements offering spatially selective phase delays can be used to assemble free-space couplers that offer broadband, efficient mode conversion. Hence, the device can be used both to up—as well as down—convert the signal from the $LP_{01}$ to the $LP_{02}$ mode, and vice versa.

2) Beam shaping elements of various kinds have been used to spatially transform a beam of light. Examples include combinations of diffractive lenses, lens arrays and combinations to provide astigmatic corrections. Typically, such elements are used to change the aspect ratio of a spatial pattern, as is needed to couple light from laser diodes to fibers, but the concept can be extended to change the spatial pattern between modes of a fiber too.

Figure 9:
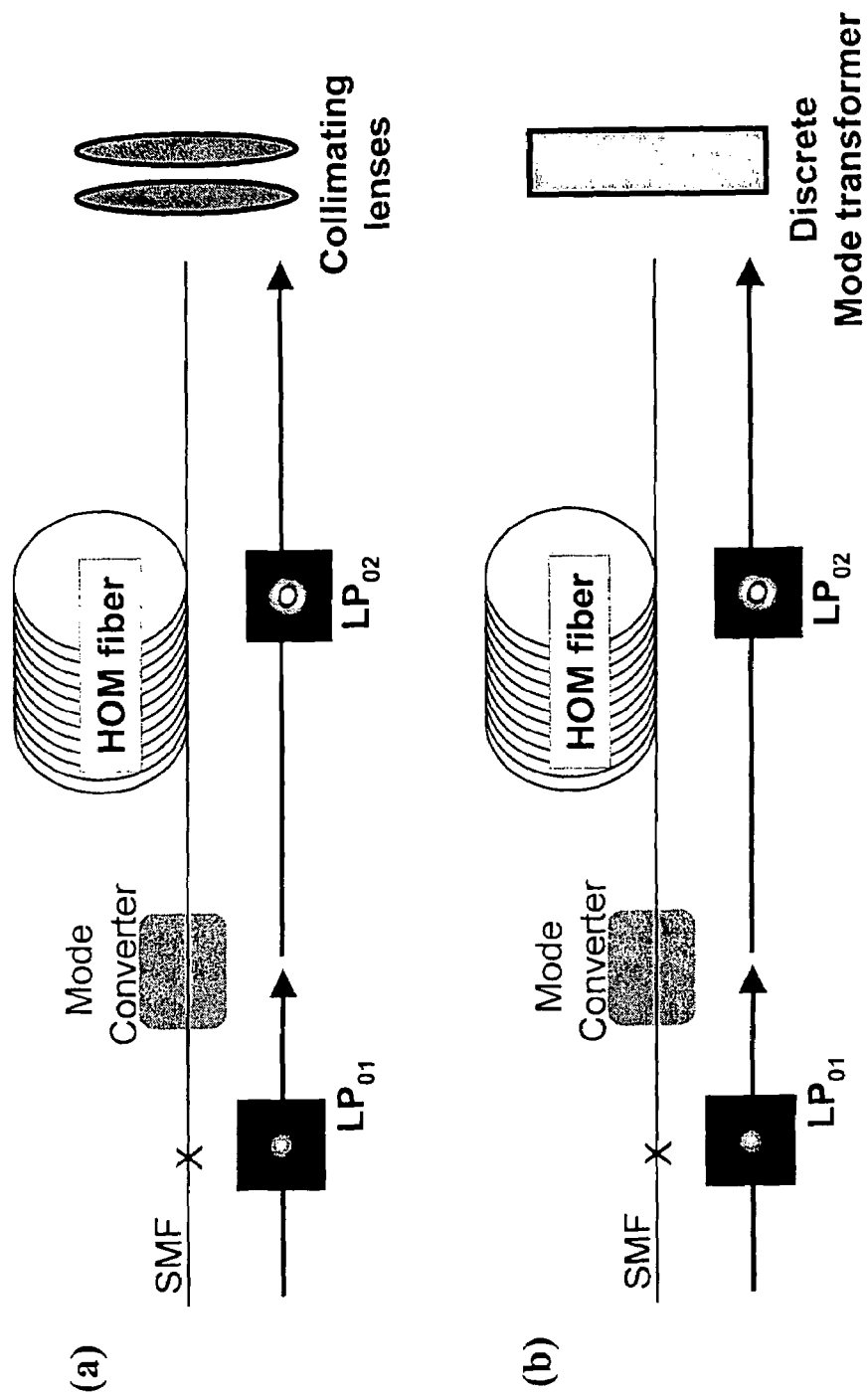
FIGS. 9*a* and 9*b* illustrates devices with an HOM converter at the input only.

All the mode converters described above can be used to offer the spatial mode transformation between the $LP_{01}$, and $LP_{02}$ modes, as depicted in the schematic of FIG. 7. An alternative schematic is also useful, as shown in FIG. 9. Here the input signal is converted to the $LP_{02}$ mode, using any of the mode converting schemes defined above, but the output is not transmitted through a mode converter. Hence, the light exiting the device is in the $LP_{02}$ mode. This may subsequently be propagated in free space, using standard collimating lenses (FIG. 9a), or be converted into any desired beam shape with the use of free-space beam transformers described above (FIG. 9b). The prospect of free-space collimation and propagation of the $LP_{02}$ is especially attractive for high power communications applications, where low divergence angles produce efficient collimation. The $LP_{02}$ mode in a fiber is significantly less divergent than the fundamental mode, and thus is well suited for this application.

Figure 10:
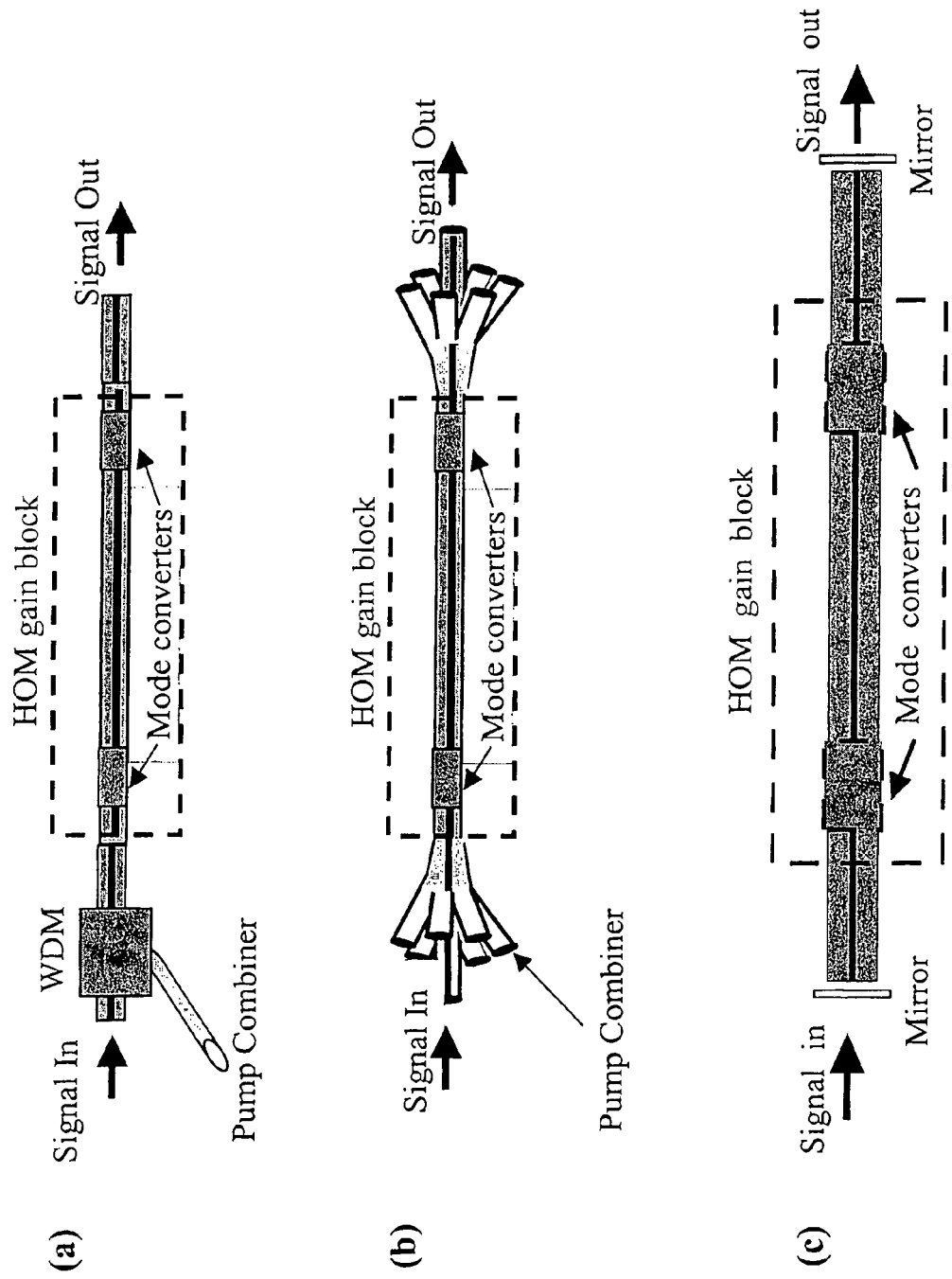
FIGS. 10*a*–10*c* illustrate pumping and mirror arrangements suitable for use with the invention.

For the gain-block sub-assemblies described above to operate as an amplifier or laser, the dopants in the fiber are pumped with laser light corresponding to their absorption bands. This may be achieved by several techniques previously disclosed for pumping high power sources and amplifiers. FIG. 10a shows a conventional pumping schematic used for pumping amplifiers for moderate as well as high power applications—the schematic most commonly used to pump erbium doped fiber amplifiers in communications systems. Pump light from fiber-coupled laser-diodes is multiplexed onto the input fiber of the gain block with a multiplexer. The multiplexer may act as both a wavelength- as well as a polarisation-selective element, thus enabling the prospect of adding several pump beams into the gain block. For even higher power applications, a fiber-tapered bundle may be used to introduce light from many laser-diode pumps into the cladding of the gain fiber. Such devices are well known. FIG. 10b illustrates this schematic. In this case, the HOM fibers disclosed in this application will be coated with low-index polymer jackets so as to enable confining the pump light in the cladding of the fiber. FIG. 10 (c) illustrates a side pumped laser with end mirrors. End pumping the laser, as suggested by FIGS. 10 (a) and 10 (b) is also an option. Reflecting means other than mirrors, e.g. gratings, may be used.

Methods for making optical fibers with the profiles shown here are well known and well developed. The core region generally consists of silica doped with germanium at concentrations less than 10 wt % at the position of maximum index, and graded with radius to provide the shape desired. The center core is typically has a radius of less than 10 microns. The inner cladding region may be undoped, as in the case of the ring design shown in FIGS. 2 and 3, or lightly doped with germania as in the case of the truncated cladding design shown in FIGS. 4 and 5. In the ring design, the inner cladding extends between the core region and the ring to a radial distance of typically 20–50 microns. The ring is an updoped region, usually doped with germania, with a radial width typically 1–5 microns. In the truncated cladding design the ring is omitted. In both designs the next region is a down-doped, typically fluorine-doped, trench region of considerable depth, i.e. at least 0.005 $\Delta n$ from the doping level of the inner cladding. The recommended radial width of the deep trench is 5–15 microns. The index of refraction in the trench region is typically approximately constant as a function of radius, but is not required to be flat. The trench region generally consists of $SiO_2$, doped with appropriate amounts of fluorine to achieve the desired index of refraction, and optionally germania to lower glass defect levels.

As described in detail above, the optical fibers in the input, gain and output section of the device are designed to support specific guided modes. That characteristic, when specified herein, means that at least 50% of the optical energy in the fiber is in the designated mode.

As used herein, the term $\Delta N$ refers to a percentage deviation from a baseline, the baseline being the refractive index of pure silica. As evident from the description above, the optical fiber in the high-gain block of the optical fiber device of the invention has a core, an inner cladding, and a trench. Optionally, it has a ring between the inner cladding and the trench to aid in controlling bend losses. Also, it may have an outer cladding outside the trench. The refractive index profile of the optical fiber can be expressed in terms of the radial position of these regions in microns.

Mentioned earlier is the use of a LOM input, for example a ring mode from a high power laser. The input for the device of the invention may be a LOM such as LP02, and the mode conversion to LP12, for example. The output from the devices described above, i.e. the LP02 output, instead of converting back to LP01, may be used as the input for a second stage of a two-stage amplifier, Various other modifications of this invention will occur to those skilled in the art. In particular, the characteristics of mode separation and selectivity may be advantageous even for moderate modefield areas, between 350 and 1600 $\mu m^2$. This is because known designs for fibers supporting HOMs with adequate mode separation and selectivity are restricted to $A_{eff}$ of approximately 100 $\mu m^2$. In addition, it is expected that alternate fiber designs can achieve grater than 2800 $\mu m^2$. All deviations from the specific teachings of this specification that basically rely on the principles and their equivalents through which the art has been advanced are properly considered within the scope of the invention as described and claimed.

The invention claimed is:

1. An optical device comprising:
   an input optical fiber supporting a lower order mode (LOM),
   a first mode converter for converting the LOM to a high order mode (HOM),
   a gain section connected to the mode converter, the gain section comprising an optical fiber supporting the HOM, and having an Aeff of at least 350 microns$^2$.

2. The optical device of claim 1 wherein the gain section has an Aeff of at least 500 microns$^2$.

3. The optical device of claim 1 wherein the optical fiber in the gain section is a few mode fiber.

4. The optical device of claim 3 wherein the optical fiber in the gain section supports LP02.

5. The optical device of claim 4 wherein the input optical fiber supports LP01.

6. The optical device of claim 1 further including a second mode converter for converting the HOM to a LOM.

7. The optical device of claim 1 wherein the optical fiber in the gain section comprises a core, an inner cladding, and a trench.

8. The optical device of claim 7 wherein the optical fiber in the gain section additionally comprises a ring between the inner cladding and the trench.

9. The optical device of claim 7 wherein the optical fiber in the gain section additionally comprises an outer cladding outside the trench.

10. The optical device of claim 7 wherein inner cladding of optical fiber in the gain section has a doping level that is essentially flat and has a $\Delta n$ of less than 0.002.

11. The optical device of claim 7 wherein the inner cladding extends to a radius of at least 20 microns.

12. The optical device of claim 7 wherein the inner cladding and the core produce a mode field diameter of at least 40 microns.

13. The optical device of claim 3 wherein the trench has a depth at least 0.003 $\Delta n$ from the inner cladding.

14. The optical device of claim 13 wherein the trench has a width in the range 5–15 microns.

15. The optical device of claim 3 wherein the mode converter comprises a long period grating.

16. The optical device of claim 1 in which the HOM fiber supports more than one mode with a difference in effective index $Dn_{eff}$ between the dominant propagation mode and other modes is greater than $8 \times 10^{-5}$.

17. The optical device of claim 1 in which the mode converter functions as a wavelength selective filter.

18. An optical amplifier comprising the optical device of claim 1 and an optical pump.

19. A laser comprising the optical device of claim 1, an optical pump, and optical reflectors at the input and output ends of the device.

20. The optical device of claim 1 wherein the fiber is doped with a rare earth selected from Er, Yb, Nd, Tm, Pr, Ho, Dy or combinations thereof.

* * * * *